(12) United States Patent
Dadgar et al.

(10) Patent No.: US 6,326,439 B1
(45) Date of Patent: Dec. 4, 2001

(54) PROCESS FOR BROMINATING POLYSTYRENIC RESINS

(75) Inventors: Billie B. Dadgar; Donald E. Balhoff; Charles H. Kolich; Meng-Sheng Ao; Homer C. Lin, all of Baton Rouge, LA (US)

(73) Assignee: Albemarle Corporation, Richmond, VA (US)

( * ) Notice: Subject to any disclaimer, the term of this patent is extended or adjusted under 35 U.S.C. 154(b) by 0 days.

(21) Appl. No.: 09/153,502

(22) Filed: Sep. 15, 1998

Related U.S. Application Data

(63) Continuation of application No. 08/852,462, filed on May 7, 1997, which is a continuation-in-part of application No. 08/727,341, filed on Sep. 26, 1996, now Pat. No. 5,677,390.

(51) Int. Cl.[7] ....................................... C08F 8/22
(52) U.S. Cl. ......................... 525/333.4; 525/356
(58) Field of Search ........................................... 525/333.4

(56) References Cited

U.S. PATENT DOCUMENTS

| | | | |
|---|---|---|---|
| 1,890,772 | 12/1932 | Dykstra | 260/93.5 |
| 2,199,026 | 4/1940 | Levine et al. | 260/74 |
| 2,823,201 | 2/1958 | Wheaton | 260/93.5 |
| 3,009,906 | 11/1961 | Eichhorn et al. | 260/93.5 |
| 3,039,977 | 6/1962 | Ingram | 260/2.5 |
| 3,050,476 | 8/1962 | Tress et al. | 260/2.5 |
| 3,132,045 | 5/1964 | Hill | 117/138 |
| 3,474,067 | 10/1969 | Praetzel et al. | 260/41 |
| 3,506,741 | 4/1970 | Trepka et al. | 260/889 |
| 3,534,012 | 10/1970 | Dennis | 260/91.5 |
| 3,932,542 | 1/1976 | Gerns | 260/650 R |
| 3,959,398 | 5/1976 | Jalics | 260/650 R |
| 3,975,354 | 8/1976 | Buxbaum et al. | 260/40 R |
| 4,028,486 | 6/1977 | Jalics | 526/293 |
| 4,074,032 | 2/1978 | Naarmann et al. | 526/44 |
| 4,107,231 | 8/1978 | Wurmb et al. | 260/873 |
| 4,137,212 | 1/1979 | Theysohn et al. | 260/37 N |
| 4,143,221 | 3/1979 | Naarmann et al. | 526/44 |
| 4,151,223 | 4/1979 | Neuberg et al. | 260/873 |
| 4,178,327 | 12/1979 | Hall et al. | 525/169 |
| 4,200,703 | 4/1980 | Diebel et al. | 525/357 |
| 4,352,909 | 10/1982 | Barda et al. | 525/157 |
| 4,360,455 | 11/1982 | Lindenschmidt et al. | 252/609 |
| 4,389,517 | 6/1983 | Priddy et al. | 526/64 |
| 4,394,484 | 7/1983 | Jenkner et al. | 525/72 |
| 4,501,859 | 2/1985 | Newman et al. | 525/356 |
| 4,513,116 | 4/1985 | Kowalski et al. | 525/53 |
| 4,548,995 | 10/1985 | Kowalski et al. | 525/354 |
| 4,554,326 | 11/1985 | Kowalski et al. | 525/354 |
| 4,636,554 | 1/1987 | Tada et al. | 525/359.3 |
| 4,650,832 | 3/1987 | Kowalski et al. | 525/354 |
| 4,748,286 | 5/1988 | Daren et al. | 570/200 |
| 4,832,873 | 5/1989 | Favstritsky et al. | 252/601 |
| 4,835,222 | 5/1989 | Sypniewski | 525/359.5 |
| 4,879,353 | 11/1989 | Sanders et al. | 525/357 |
| 4,975,496 | 12/1990 | Tigner et al. | 525/357 |
| 5,112,896 | 5/1992 | Dever et al. | 524/412 |
| 5,112,897 | 5/1992 | Dever et al. | 524/412 |
| 5,112,898 | 5/1992 | Dever et al. | 524/412 |
| 5,194,482 | 3/1993 | Chundury et al. | 524/412 |
| 5,235,000 | 8/1993 | McKinnie | 525/355 |
| 5,243,109 | 9/1993 | Kornberg et al. | 570/193 |
| 5,304,618 | 4/1994 | Atwell et al. | 526/293 |
| 5,326,837 | 7/1994 | Kissin | 526/150 |
| 5,328,983 | 7/1994 | Favstritsky et al. | 528/490 |
| 5,334,680 | 8/1994 | Mukai | 526/207 |
| 5,369,202 | 11/1994 | Atwell et al. | 526/293 |
| 5,532,322 | 7/1996 | Kadono et al. | 525/357 |
| 5,637,650 | 6/1997 | Gill et al. | 525/356 |
| 5,677,390 | 10/1997 | Dadgar et al. | 525/355 |
| 5,686,538 | 11/1997 | Balhoff et al. | 525/355 |
| 5,723,549 | 3/1998 | Dever et al. | 525/333 |
| 5,726,252 | 3/1998 | Gill et al. | 525/333.3 |
| 5,733,823 | 3/1998 | Sugioka et al. | 442/110 |
| 5,767,203 | 6/1998 | Ao et al. | 525/355 |
| 5,852,131 | 12/1998 | Balhoff et al. | 525/355 |
| 5,852,132 | 12/1998 | Dadgar et al. | 525/355 |
| 5,916,978 | 6/1999 | Ao et al. | 525/355 |

FOREIGN PATENT DOCUMENTS

| | | |
|---|---|---|
| 0 020 294 | 12/1980 | (EP) . |
| 0 139 931 | 8/1985 | (EP) . |
| 0201411 | 12/1986 | (EP) . |
| 0 277 429 | 8/1988 | (EP) . |
| 0 394 645 | 10/1990 | (EP) . |
| 0 763 567 | 3/1997 | (EP) . |
| 1589700 | 5/1981 | (GB) . |
| 61034723 | 8/1986 | (JP) . |
| 63-150349 | 6/1988 | (JP) . |
| 2215807 | 8/1990 | (JP) . |
| 6-322022 | 11/1994 | (JP) . |
| 7-2930 | 1/1995 | (JP) . |
| 8-53511 | 2/1996 | (JP) . |
| 10-130325 | 5/1998 | (JP) . |
| 3020708 B2 | 3/2000 | (JP) . |
| WO9503341 | 2/1995 | (WO) . |
| WO 98 50439 | 11/1998 | (WO) . |

OTHER PUBLICATIONS

Wenger, Richard M., "Glass Reinforced Flame Retardant Nylon–Improved Performance For Connector Applications," dated approximately 1984, 19 pages.

Brochure from Ferro Corporation, Fire Retardant Chemical Association, Fall 1992 Conference, "Brominated Polystyrene Flame Retardant Additives", pp. 141–150.

(List continued on next page.)

Primary Examiner—Bernard Lipman
(74) Attorney, Agent, or Firm—E. E. Spielman, Jr.

(57) ABSTRACT

This invention relates to a thermally stable brominated polystyrene having less than 100 ppm total Cl⁻, above about 68 wt % bromine and less than about 6,000 ppm hydrolyzable halide. The brominated polystyrene exhibits little or no polymer cross-linking or chain cleavage relative to the starting polystyrene.

38 Claims, 1 Drawing Sheet

OTHER PUBLICATIONS

McCabe et al., "Unit Operations of Chemical Engineering," McGraw–Hill Book Company, Third Edition, pp. 619–627.

Derwent Abstract of JP 8053511.

Patent Abstracts of Japan (European Patent Office)—Abstract of JP 051 70809, publication date of 7/93 to Tosoh Corporation.

Brochure from Ferro Corporation, Production Information, Pyro–Chek 68PB & Pyro–Chek 60PB, Brominated Polystyrene Flame Retardant Additives, 4 pages, 1992.

JP 8176414 (Jul. 9, 1996)—Abstract No. 223551, XP002128364, Chemical Abstracts, Columbus, Ohio, vol. 125, No. 18, Oct. 28, 1996.

JP 8283550 (Oct. 29, 1996)—Abstract Class A13, AN 1997–017575, XP002128367, Database WPI Section Ch, Week 199702, Derwent Publications Ltd., London, GB.

JP 5287014 (Nov. 2, 1993)—Abstract No. 246108, XP002128365, Chemical Abstracts, Columbus, Ohio, vol. 120, No. 20, May 16, 1994.

JP 2255755 (Oct. 16, 1998)—Abstract No. 1869970, XP002128366, Chemical Abstracts, Columbus, Ohio, vol. 114, No. 20, May 20, 1991.

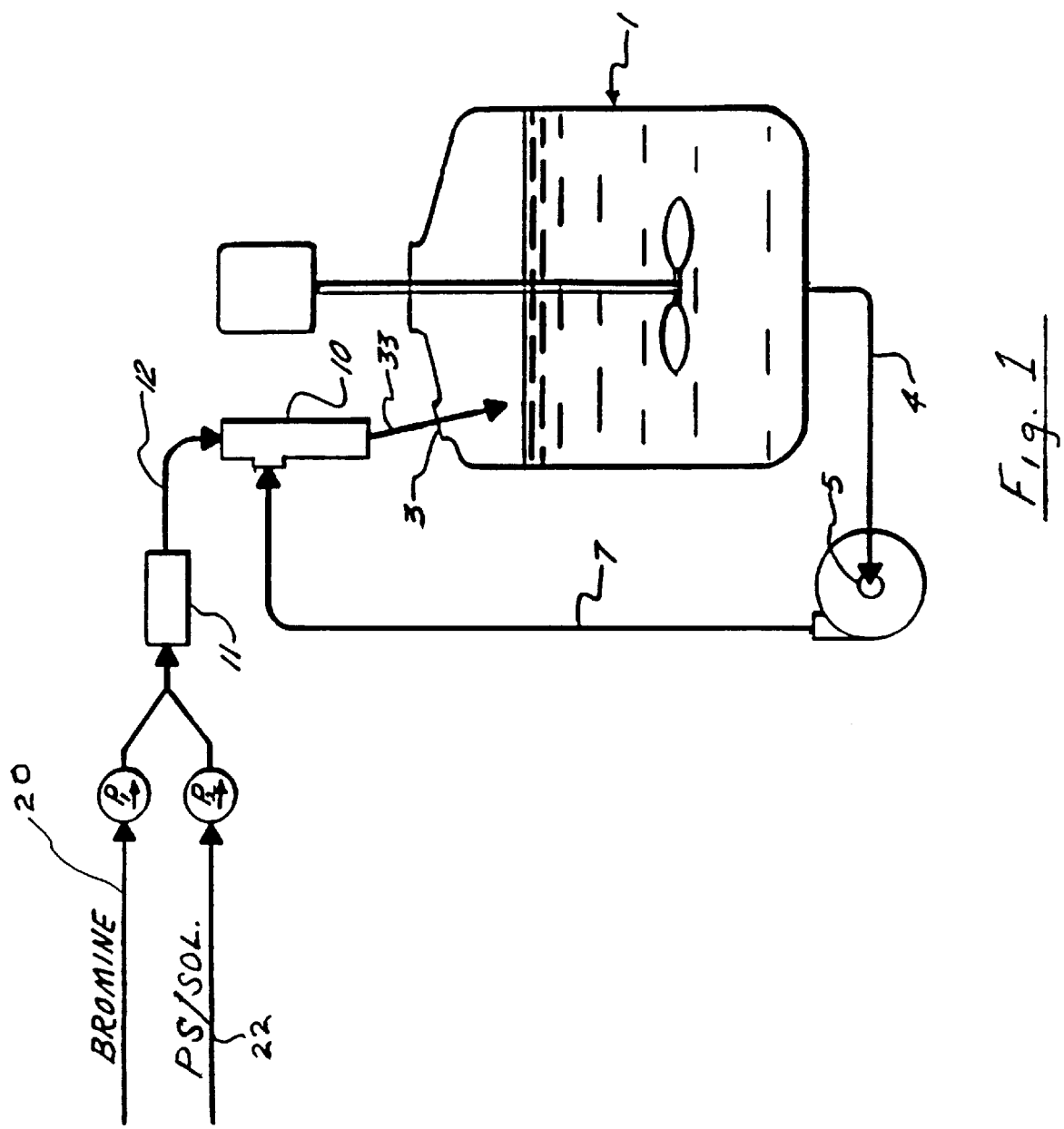

PROCESS FOR BROMINATING POLYSTYRENIC RESINS

RELATED APPLICATIONS

This application is a continuation of commonly-owned U.S. application Ser. No. 08/852,462, filed May 7, 1997, which in turn is a continuation-in-part of commonly-owned U.S. application Ser. No. 08/727,341, filed Sep. 26, 1996, now U.S. Pat. No. 5,677,390, issued Oct. 14, 1997.

BACKGROUND OF THE INVENTION

This invention relates to novel, high quality brominated polystyrenes which are especially suitable for use as flame retardants in thermoplastic formulations.

Brominated polystyrenes are well established as flame retardants for use in thermoplastics, e.g., polybutylene terephthalate, polyethylene terephthalate and nylon. Recently, interest has been shown for expanding their use to syndiotactic polystyrene and polycyclohexylene dimethylene terephthalate. Generally, brominated polystyrenes are produced by a reaction between polystyrene and a brominating agent (e.g., bromine or bromine chloride) in the presence of a solvent (e.g., dichloroethane) and a Lewis acid catalyst. Within this broad context, the prior art has developed several processes which strive to obtain a low cost but high performing brominated polystyrene. Low cost is self-explanatory. Performance is predicted by a bromine content (60–67 wt % generally being preferred), a solution color ($\Delta E=20-35$) and a chlorine content (the maximum being 1.5 wt %). The process chosen will determine the particular brominated polystyrene produced and thus, its qualities.

The bromine and chlorine content, and the color (it is believed) are properties of the structure of the particular brominated polystyrene being considered. The bromine content applies to the sum of (1) the bromine which is substituted onto the aromatic portions of the polymer, (2) the bromine which is substituted onto the alkyl portion of the polymer, e.g., the polymer backbone or which is present due to alkylation of the aromatic portion of the polymer, and (3) any ionic bromine present, e.g., sodium bromide. The alkylation reaction is catalyzed by the Lewis acid catalyst and uses the reaction solvent (usually a 1–3 carbon atom dihaloalkane) as the alkylating agent. The bromine for (1) is referred to herein as aromatic bromide, while the bromine for (2) is referred to as alkyl bromide. Even though ionic bromine (hereinafter ionic bromide) can contribute to the bromine content, its contribution is almost always small to insignificant. Ionic bromide is not part of the polymer structure and is usually washed almost entirely from the brominated polymer product before the bromine content is measured.

The color of the brominated polystyrene is also believed to be due to polymer structure and not the result of some discreet impurity. Color may be caused by the above-mentioned alkyl bromide and/or the below-mentioned alkyl chloride substituents on the aromatic moieties.

The chlorine content is credited to chlorine which, like the bromine, is part of the polymer structure as an aromatic and/or an alkyl chloride. The use of bromine chloride as the brominating agent is the largest contributor to the chlorine content.

As a universal proposition, it is preferred that the brominated polystyrene have a minimized alkyl bromide and/or alkyl chloride, i.e., alkyl halide, content. Alkyl halides are not desirable as they are not as thermally stable as are aromatic halides and, thus, they can be easily converted to hydrogen halide, e.g., HBr or HCl, under normal end-use processing conditions. Hydrogen halide, in the presence of moisture, can cause severe corroding of metal process equipment. Also, there is the matter of color, which is also believed to be impacted by some alkyl halides. A brominated polystyrene having almost all aromatic bromide (ar-bromine) will have desirable flame retarding characteristics as the bromine will not leave the aromatic moiety at processing temperatures, but rather, will leave at the very high temperatures which are encountered in the vicinity of an approaching flame front.

Outside of whether or not the halide is present as an aromatic or an alkyl halide, it is also desirable to minimize the total chlorine content of the brominated polystyrene as chlorine is not as efficacious or as stable a flame retardant constituent as is bromine.

The desirability of obtaining a high aromatic bromine content along with a low alkyl halide and total chlorine content is, unfortunately, not matched by the ability of prior art processes to produce same. Even though the art has proffered many processes which are claimed to produce a superior brominated polystyrene, none have actually been shown to deliver on their promise. See U.S. Pat. Nos. 4,200,703; 4,352,909; 4,975,496 and 5,532,322. A review of the Examples in these patents, which are reported to be actual experiments, shows that a high bromine content, say 68 wt % or above, is not obtained, much less that such could be obtained without a concomitant high alkyl bromine content, say above 6,000 ppm, based upon the total weight of the brominated polystyrene. [Alkyl bromide and chloride are generally referred to by the art and quantified, respectively, as hydrolyzable bromide and hydrolyzable chloride since such halides are easily hydrolyzed as compared to aromatic halides. A method for determining the hydrolyzable halide (bromide and chloride) content of a brominated polystyrene polymer is described infra. Alkyl halide, alkyl bromide and alkyl chloride will be referred to herein, respectively, as hydrolyzable halide, hydrolyzable bromide and hydrolyzable chloride.]

Further, the prior art brominated polystyrenes do not exhibit high thermal stability. Prior art polymers exhibit a 1% weight loss at temperatures less than 336° C. when submitted to Thermo-gravimetric Analysis (TGA) and, indeed, most exhibit a 1% weight loss at temperatures around 300° C. A low thermal stability is not desired when the brominated polystyrene is formulated with thermoplastic formulations which will be exposed to high processing temperatures.

Additionally, it has been demonstrated that prior art processes for the manufacture of brominated polystyrene give rise to significant cleavage of the polymer chain. This cleavage results; in the produced brominated polystyrene having an $M_w$, as measured by Gel Permeation Chromatography, which is significantly lower than the calculated theoretical $M_w$ of the brominated polystyrene. The calculation is based upon the bromine content (wt %) of the brominated polystyrene product and the $M_w$, of the polystyrene reactant at reaction initiation. It is advantageous if the theoretical and actual $M_w$'s of the produced brominated polystyrene are close, given the ± margins of error for GPC, since such closeness evidences a paucity of polymer cleavage. The degree of cleavage should be minimized since cleavage results in an increase of alkyl end groups in the brominated polystyrene, which alkyl end groups provide loci for the facile formation of the undesirable hydrolyzable halides; discussed above.

Thus, it is an object of this invention to provide a thermally stable brominated polystyrene It is also an object of this invention to provide for a thermally stable brominated polystyrene which contains at least 68 wt % bromine, of which less than about 6,000 ppm is hydrolyzable bromide. It is a further object of this invention to provide for the foregoing brominated polystyrene which, in addition, contains less than about 100 ppm total chlorine. It is still further an object of this invention to provide a brominated polystyrene having an actual $M_w$ which is close to its calculated theoretical $M_w$, the theoretical $M_w$ being based upon (i) the actual bromine content of the brominated polystyrene and (ii) the $M_w$ of the polystyrene reactant used to produce the brominated polystyrene.

THE INVENTION

This invention provides for a novel brominated polystyrene which is very thermally stable as is evidenced by the polymer having a TGA 1% weight loss at a temperature in excess of 340° C. and, preferably, within the range of from about 340° C. to about 380° C. and, most preferably, within the range of from about 345° C. to about 380° C. Most highly preferred is a TGA value at 1% weight loss which is within the range of from about 345° C. to 375° C. Comparisons between the low TGA values for prior art products and the TGA values for polymers of this invention are reported in the Examples and Tables infra. The high TGA temperatures which are characteristic of the polymers of this invention are not believed to be due to post reaction purification techniques. Rather, it is speculated that the enhanced thermal stability is due to the chemical makeup of the brominated polystyrene.

This invention also provides for a novel thermally stable brominated polystyrene which is comprised of polymer units having the formula:

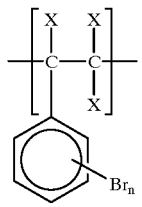

wherein each X is independently –H or a hydrolyzable halide, the identity of each X for each polymer unit being such that the brominated polystyrene contains less than about 6,000 ppm hydrolyzable halides, and wherein the value of n for each polymer unit is such that the brominated polystyrene contains at least 68 wt % bromine. (All ppm values used herein are by weight and are based upon the total weight of the brominated polymer unless otherwise indicated.) It is preferred that the bromine content be within the range of from about 68 wt % to about 71 wt % (n=about 2.7 to about 3.1) and most preferably, from an economic and performance standpoint, within the range of from above 68 wt % to about 70 wt % (n=2.7 to about 3.0).

With regard to the hydrolyzable halides, preferred brominated polystyrenes will be those in which the hydrolyzable halide is bromide. Such polymers may contain some hydrolyzable chloride., but the amount will be insignificant, say less than about 100 ppm. If chlorine is present, its source would probably be the Lewis acid catalyst or the solvent used in the preparation of the brominated polystyrene. Preferred brominated polystyrene polymers are those in which the chlorine content is not detectable in accordance with X-Ray Fluoresence analysis. It is beneficial, from the viewpoint of economy and performance, that the hydrolyzable bromide content be less than about 4,000 ppm, say within the range of from about 1,000 ppm to about 3,000 ppm. Most beneficial are those contents which are within the range of from about 1,500 ppm to about 2,500 ppm.

The brominated polystyrene of this invention are unique in that, from their very inception., the polymer has the very low hydrolyzable halide content discussed above. This is an important aspect as the polymers do not need further treatment to reduce the hydrolyzable halide content. Reduction of the hydrolyzable halide content, say by hydrolysis, is not desirable as it yields a, polymer having hydrolysis residues, e.g., –OH, in its structure which can alter the polymer's, properties. It is preferred that the brominated polystyrenes of this invention contain little or no hydrolysis residues, say less than about 500 ppm and preferably less than about 100 ppm.

The most preferred brominated polystyrenes of this invention will be those which provide, at the lowest cost, the highest bromine content and the lowest hydrolyzable halide content which obtain the desired performance.

This invention also provides for a brominated polystyrene having an actual $M_w$ which is within about 20% of its calculated theoretical $M_w$, the theoretical $M_w$ being based upon the actual bromine content of the brominated polystyrene and the $M_w$ of the polystyrene reactant used to produce the brominated polystyrene. A difference between the actual $M_w$ and the theoretical $M_w$, outside of the normal ± margin of error for GPC analysis, is evidence of either cross-linking (increases the $M_w$) or polymer chain cleavage (decreases the $M_w$). The 20% difference mentioned above for the brominated polystyrenes of this invention includes the ± margin of error. Preferred differences are those less than about 20%, with differences of less than about 10% being most preferred. Since GPC techniques can give different but similar values for the same polymer tested, defining a brominated polystyrene as being of this invention is best performed by taking the arithmetic average of five consecutive GPC determinations of the polymer to be tested. Other data averaging techniques are suitable, such as using the average of 10 consecutive GPC determinations with discard of the high and low values, the only requirement being that accurate and reproducible results are obtained.

The polystyrene reactant used in the production of the brominated polymers of this invention can be any of those which are commercially available. Generally, the polystyrene backbone will not have been hydrogenated and, thus, will have unsaturation. There is no need for the brominated polymers of this invention to be produced from anionically produced polystyrene as is taught in EPO 0 201 411; in fact, it is preferred that the polystyrene reactant not be an anionically produced polystyrene as such polymers are expensive and not readily available. The aromatic pendant constituents of the polymer can be alkyl substituted, but in most cases, will not be so substituted. The polystyrene used to produce the brominated polystyrenes of this invention will have a $M_w$ within the range of from about 500 to about 500,000 and a polydispersity within the range of from above about 1 to about 4. For most purposes, the polystyrene reactant will have a $M_w$ within the range of from about 100,000 to about 300,000 and will have a polydispersity within the range of from about 1.25 to about 2.5. The lower molecular weight polystyrene reactants will have a $M_w$ within the range of from about 500 to about 100,000 and a polydispersity less than about 10 and preferably within the range of from above 1 to about 4. Higher molecular weight polymer reactants of this invention have a $M_w$ within the range of from about 300,000 to about 500,000 and a polydispersity within the range of from above 1 to about 4. The $M_w$ and polydispersity values are both based on gel permeation chromatography (GPC) techniques which are hereinafter described.

It has also been found preferable that the polystyrene used in the formation of the brominated polystyrenes of this invention not contain any additives, such as zinc stearate, paraffins, mineral oils, and the like. A highly preferred polystyrene is Styron® 612 which is marketed by The Dow Chemical Company of Midland, Mich.

The brominated polystyrenes of this invention exhibit additional superior physical properties, e.g., color. For flame retardants, color is an important property, with pure white being the ultimate goal. Due to the formation of various color bodies by all bromination processes, the industry has accepted near-white products as being acceptable. The color of prior art brominated polystyrene, expressed as a solution ΔE value, generally will fall within the range of 20 to 35. In distinction, the brominated polystyrenes of this invention feature ΔE values of less than 20 and preferably within the range of from about 5 to about 18. Most preferably, the ΔE value will be within the range of from about 5 to about 15.

Another physical property of the brominated polystyrenes of this invention is that they have essentially no or very little odor when heated to a temperature above 150° C. In comparison, Ferro Corporation's Pyro-Chek® brominated polystyrene flame retardant has a noticeable and strong odor at 150° C. The strong odor is believed to be attributable to the presence of bromochloroethanes, e.g., bromodichloroethane, dibromochloroethane, dibromodichloroethane and tribromochloroethane, which are in the Pyro-Chek® 68PB product. Such bromochloroethanes are not seen in detectable quantities in the brominated polystyrenes of this invention.

When used as flame retardants in thermoplastic formulations or foam applications, the brominated polystyrenes of this invention are used in amounts which are within the range of frond about 5 to about 20 wt %, the wt % being based on the total weight of the formulation. The thermoplastics which may be most benefited by the subject brominated polystyrenes are polyethylene terephthalate, polybutylene terephthalate, polycyclohexylene dimethylene terephthalate, nylon and the like. Conventional additives, such as antimony flame retardant synergist, antioxidants, UV stabilizers, pigments, impact modifiers, fillers, acid scavengers, blowing agents, and the like, can be included with the formulations or foams as is appropriate.

ANALYTICAL METHODS

Since brominated polystyrene has good solubility in solvents such as tetrahydrofuran (THF) the determination of the total bromine content for the brominated polystyrene is easily accomplished by using conventional X-Ray Fluorescence techniques. The sample analyzed is a dilute sample, say 0.1±0.05 g brominated polystyrene in 60 mL THF. The XRF spectrometer can be a Phillips PW1480 Spectrometer. A standardized solution of bromobenzene in THF is used as the calibration standard. The bromine values described herein and reported in the Examples are all based on the XRF analytical method.

To obtain the hydrolyzable halide content of the brominated polystyrenes disclosed herein, the alkyl halide constituents of the brominated polystyrene are hydrolyzed with ethanolamine to yield amine hydrogen halide by-product which remains in the reaction mix. The reaction mix is then titrated with $AgNO_3$ which will measure the amount of amine hydrogen bromide, amine hydrogen chloride and any ionic bromide and ionic chloride present in the starting material. The amount of hydrolyzable bromide is determined by subtracting the ionic bromide content from the total bromide value just obtained. The ionic bromide content is obtained by washing a separate sample of the brominated polystyrene being tested with water and measuring by $AgNO_3$ titration of the ionic bromide content in the wash water. Generally, the ionic bromide content will be low.

The following exemplifies the foregoing techniques: approximately 0.5 g of the brominated polystyrene to be analyzed is weighed to four decimal places into a 125 mL Iodine flask with a 24/40 ST joint. To the flask is added, via syringe, 15 mL of reagent-grade 2-ethanolamine. The mixture is swirled and heated under a reflux condenser to boiling. The mixture is boiled for about 1 hour and then allowed to cool. The condenser and the flask are partially disengaged, and the interior of the condenser and the joint surfaces are washed with methanol using a wash bottle. The polymer sinters into a porous cake. The flask contents are swirled to homogenize the solution (liquid portion), then the solution is carefully drained into a 400 mL tall form beaker containing a magnetic stirrer bar. Care is taken to keep any solution from running back along the flask neck. The neck is washed inside and out with methanol to avoid loss of halogen. The interior of the flask and the polymer cake are both rinsed several times with methanol in the same manner to remove surface solution, the washings all being collected in the beaker. The beaker should now contain no more than about 100mL. To the washed polymer cake in the Iodine flask is added 20 mL of reagent-grade dioxane. The flask is stoppered and gently warmed with periodic swirling until the polymer dissolves. The beaker is placed on a magnetic stirrer and the contents stirred rapidly. Then the dioxane and cake solution is slowly poured into the beaker. The polymer precipitates in a very finely-divided form. The outside of the neck and the interior of the Iodine flask is rinsed with methanol. The residual polymer coagulates and the contents of the Iodine flask are washed into the beaker. The flask is washed several more times to insure complete removal of halogen. At this point, the beaker should contain no more than about 150 mL. About 75 mL of deionized water and a few drops of Methyl Orange indicator solution are added to the beaker. Then 1:1 $H_2SO_4$ is added until the solution turns acidic (pink color). The solution may be cooled. The solution is then titrated with standardized 0.01 $AgNO_3$ using an automatic potentiometric titrator, such as a Metrohm 71 6 or its equivalent. If both $Br^-$ and $Cl^-$ are present, the $Br^-$ will titrate first. The distance between the inflection points (ΔV) is the $Cl^-$ titre. Total halide content can be calculated as follows:

$$\text{ppm } Br^- = \frac{(\text{mL } AgNO_3) \times (\text{normality } AgNO_3) \times (7.99 \times 10^4)}{\text{sample weight in grams}}$$

$$\text{ppm } Cl^- = \frac{(\text{mL } AgNO_3) \times (\text{normality } AgNO_3) \times (3.545 \times 10^4)}{\text{sample weight in grams}}$$

To determine the ionic bromide content, a 3 gram sample of the brominated polystyrene to be analyzed is weighed out on a 4 decimal place balance and added to a 125 mL wide-mouth plastic bottle. To the bottle is also added 100 mL deionized water. The bottle is then placed on a shaker for 30 minutes. To the shaken bottle is added a few drops of Methyl Orange indicator solution and a magnetic stir bar. The stirred bottle contents are acidified with 1:1 $H_2SO_4$ to obtain a pink color. The resultant solution is titrated with 0.01 N $AgNO_3$ using an automatic potentiometric titrator, such as a Methrom 716. The ionic bromide content is calculated as follows:

$$\text{ppm ionic bromide} = \frac{(\text{mL AgNO}_3) \times (\text{normality AgNO}_3) \times (7.99 \times 10^4)}{\text{sample weight in grams}}$$

To obtain the hydrolyzable bromide value, use the equation:

Hydrolyzable bromide (ppm)=Total bromide (ppm)−Ionic bromide (ppm)

To determine the color attributes of the brominated polystyrenes of this invention, use is again made of the ready solubility of brominated polystyrene in easy-to-obtain solvents, such as chlorobenzene. The analytical method used is quite straight-forward. Weigh 5 g±0.1 g of the brominated polystyrene into a 50 mL centrifuge tube. To the tube also add 45 g±0.1 g chlorobenzene. Close the tube and shake for 1 hour on a wrist action shaker. After the 1 hour shaking period, examine the solution for undissolved solids. If a haze is present, centrifuge the solution for 10 minutes at 4,000 rpm. If the solution is still not clear, centrifuge an additional 10 minutes. Should the solution remain hazy, then it should be discarded as being incapable of accurate measurement. If, however, and this is the case most of the time, a clear solution is obtained, it is submitted for testing in a Hunter-Lab ColorQuest Sphere Spectrocolorimeter. A transmission cell having a 20-mm transmission length is used. The calorimeter is set to "Delta E-lab" to report color as ΔE and to give color values for "L", "a" and "b".

For the purposes of this invention, DSC values were obtained with a TA Instruments DSC Model 2920. Samples were heated from 25° C. to 400° C. at 10° C./min under nitrogen.

Thermogravimetric analysis (TGA) is used to test the thermal behavior of both prior art brominated polystyrene and the brominated polystyrenes of this invention. The TGA values are obtained by use of a TA Instruments Thermogravimetric Analyzer. Each sample is heated on a Pt pan from 25° C. to about 600° C. at 10° C./min with a nitrogen flow of 50–60 ml/min.

The $M_w$ values were obtained by GPC using a Waters model 510 HPLC pump and, as detectors, a Waters Refractive Index Detector, Model 410 and a Precision Detector Light Scattering Detector, Model PD2000. The columns were Waters, µStyragel, 500 Å, 10,000 Å and 100,000 Å. The autosampler was a Shimadzu, Model Sil 9A. A polystyrene standard ($M_w$=185,000) was routinely used to verify the accuracy of the light scattering data. The solvent used was tetrahydrofuran, HPLC grade. The test procedure used entailed dissolving 0.015–0.020 g of sample in 10 ml, of THF. An aliquot of this solution is filtered and 50 µL is injected on the columns. The separation was analyzed using software provided by Precision Detectors for the PD 2000 Light Scattering Detector.

The calculated theoretical $M_w$ values were obtained in accordance with the formula:

$$\text{Theoretical } M_w \text{ BrPS} = M_w \text{PS} + \frac{(M_w \text{PS})(\text{Atom. wt. Br} - \text{Atom. wt. H})(\text{Mol. wt. Sty.})(0.01)(\text{wt \% Br})}{(\text{Atom. wt. Br})(\text{Mol. wt. Sty.}) - (\text{Atom. wt. Br} - \text{Atom. wt. H})(\text{Mol. wt. Sty.})(0.01)(\text{wt \% Br})}$$

As used throughout this application, PS is used interchangeably with and meant to designate polystyrene, while Sty. means styrene. The term "$M_w$" means weight average molecular weight as determined by GPC. (light scattering detector) described infra.

EXAMPLE I

Of the Invention

A mixture of 770.0 g bromochloromethane (BCM, 9 ppm water) and 2.775 g $AlCl_3$ was prepared in a 5-L jacketed glass reactor equipped with a mechanical paddle stirrer, condenser, and thermowell. A jacketed glass mixing tee was mounted on an inlet port on the reactor to which bromine (533.35 g, 3.337 mole) and a solution of 134.00 g (1.287/n mole) polystyrene (Mitsubishi Kasei Polytex, $M_w$=270,000) in 1204 g BCM were pumped at average rates of 8.74 g/min and 20.27 g/min, respectively. The reactor and mixing tee were cooled with a circulating glycol bath to maintain a temperature of 0° C. to 2° C. throughout the 1 hour feed time and subsequent 1 hour cook. The reaction mixture was then washed with water and neutralized with a mixture of aqueous sodium gluconate, sodium sulfite, and sodium hydroxide. After diluting the organic phase with additional BCM (1450 g), the solution was added dropwise to 1.8 L hot (90° C.–94° C.) water containing 0.25 g dioctyl sulfosuccinate sodium salt (surfactant) to precipitate the product and distill the solvent. The slurry was filtered and the off-white solid was washed with water. Drying to constant weight at 150° C. gave 389.8 g.

Examples II and III prepare brominated polystyrene in accordance with the teachings of U.S. Pat. No. 5,532,322.

EXAMPLE II

A solution of 75.10 g (0.721/n mole) of polystyrene (Mitsubishi Kasei Polytex, $M_w$=270,000) in 750 g of 1,2-dichloroethane (EDC, containing 12 ppm water) was prepared in a 5-L jacketed glass reactor equipped with a mechanical paddle stirrer, condenser, and thermowell. The temperature of the reaction was controlled with an ethylene glycol circulating bath on the reactor jacket. After cooling to 15° C., 11.03 g of antimony (III) oxide was added to the polystyrene solution. A previously prepared solution of 149.7 g (0.937 mole) bromine and 66.3 g (0.935 mole) chlorine in 505 g cold (−5° C.) EDC was added to the reactor under the liquid surface through a diptube attached to the cooled bromine chloride feed reservoir. The reaction temperature was slowly increased from 10° C. to 25° C. during the 2 hour addition. The mixture was then held at 30° C. until hydrogen halide evolution was complete (1.5 hr) as indicated by an end of the weight gain of the caustic scrubber on the exit gas line from the reactor. The reaction mixture was washed with water and neutralized with aqueous sodium sulfite and caustic. The organic phase was then added dropwise to 3.5 L methanol to precipitate the product. The slurry was filtered and the solid was washed with methanol. After vacuum drying at 150° C., the light yellow solid (product 1) weighed 203.7 g.

EXAMPLE III

Example II was repeated using 230.8 g (2.00 mole) commercial bromine chloride with 80.2(0 g (0.770/n mole) polystyrene and 11.77 g $Sb_2O_3$. The water washed and neutralized organic phase was divided into two equal portions. One portion was added to 1.5 L of methanol as in Example I to obtain 101.6 g of light yellow solid (product A) after drying to constant weight at 150° C. The other portion was added dropwise to 1.9 L of hot (89° C.–94° C.) water to precipitate the product and distill the solvent. The dry light yellow solid (product B) weighed 100.3 g.

In Table I, a compilation of the properties of the brominated polystyrene products produced in Examples I–III is given. In addition, for comparison purposes, the properties of Ferro Corporation's Pyro-Chek® 68PB flame retardant are given. Pyro-Chek® 68PB is believed to be produced in accordance with the teachings of U.S. Pat. No. 4,352,909.

overall mol ratio of $Br_2$/PS was 2.70. A rinse of 260.95 g of dry BCM was used for the PS solution feed system to assure complete transfer of the polymer to the reaction flask. The reaction temperature was maintained at 0° C. to 4° C. throughout the addition and subsequent 2.3 hour cook period (with nitrogen purge of the reactor overhead). The weight increase for the caustic exit gas scrubber was 665.4 g (87.8% of theory for HBr). The catalyst was deactivated by addition of 125.0 g of a 10 wt % aqueous solution of sodium gluconate. A 63.41 g portion of 10 wt % aqueous sodium sulfite was added, and the pH was adjusted to 14 by addition of 423.0 g of 10 wt % aqueous NaOH. After dilution with BCM (1334.6 g), the organic phase was separated and then washed with water (1011.8 g). The product was recovered from the organic phase by addition to vigorously stirred hot (90° C.–94° C.) water to which was added 1.23 g of the sodium salt of dioctyl sulfosuccinate. The solvent distilled from the hot water leaving a slurry of brominated polysty-

TABLE 1

ANALYTICAL RESULTS

| Example | I | II | III (A) | III (B) | Pyro-Chek ® 68 PB |
|---|---|---|---|---|---|
| Total Br (wt %) | 69.47 | 63.48 | 63.10 | 63.00 | 67.2 |
| Hydrolyzable Br (wt %) | 0.13 | 0.47 | 0.32 | 0.31 | 0.73 |
| Total Cl (wt %) | <0.01 | 1.00 | 0.68 | 0.83 | 0.71 |
| GPC $M_w$ (light scat.) | 920,000 | 560,000 | 580,000 | 580,000 | 620,000 |
| Calc'd. Theo. $M_2$ GPC (light scat.) | 860,000 | 720,000 | 715,000 | 715,000 | —* |
| DSC Tg (° C.) | 190 | 170 | 164 | 162 | 185 |
| DSC Td (° C.) | 389 | 373 | 321 | 322 | no data |
| TGA 1% wt loss @ (C. °) | 349 | 312 | 311 | 293 | 300 |
| Solution Color | | | | | |
| L | 96.32 | 96.21 | 94.99 | 94.62 | 92.03 |
| a | −2.09 | −2.36 | −2.32 | −2.33 | −0.17 |
| b | 11.99 | 15.07 | 16.96 | 17.06 | 23.38 |
| ΔE | 12.72 | 15.71 | 17.83 | 18.03 | 24.70 |

*Calculated Theoretical $M_w$ for Pyro-Chek ® 68 PB cannot be determined since the $M_w$ of the polystyrene reactant used in 68 PB is not known.
Tg = glass transition temperature
Td = decomposition temperature

EXAMPLE IV

Of the Invention

A 7.209 g (54.1 mmol) portion of aluminum chloride was suspended (stirred at 250 rpm) in 1549.83 g of dry (10 ppm water) bromochloromethane (BCM) in a 5-L jacketed reaction flask cooled to 0° C. by a circulating glycol bath. A 10.00 wt % solution of PS (360.96 g, 3.4657/n mol) in dry BCM (3250.44 g) was prepared in a second 5-L flask. The PS used was The Dow Corporation's Styron® 612 which had a $M_w$ of 190,000. The PS solution was pumped from the bottom valve of this feed reservoir to a jacketed, glycol-cooled mixing tee mounted on the reaction flask. At the same time, bromine was pumped from a tared feed reservoir to the same mixing tee where it combined with the polystyrene solution before dropping into the stirred catalyst suspension in the reaction flask. Two Masterflex® 0 7550–90 pumps were used. The PS feed system used an all-Teflon feed line with pump head 77390 operating at a constant speed of 60 rpm. This provided a constant feed rate of 21.02/n mmol PS/min (21.89 g/min). The bromine feed system used a combination of Teflon and Viton tubing with pump head 7518–10 operating at a rate of 70.05 mmol/min for the first 18 min, 38.80 mmol/min for 18–23 min, and 56.75 mmol/min for 23–165 min. Both feeds ended at 165 min. The rene product in water. After suction filtering, the off-white solid was rinsed with water and dried to a constant weight of 1085.98 g (97.9% yield) in a vacuum oven (150° C./2 torr/5 hr).

EXAMPLE V

Of the Invention

The procedure of Example IV was followed except that: a 2-L flask and 40 g of polystyrene were used; the $AlCl_3$ wt % (based on polystyrene) was 2.0 wt %; the feed mole ratio of bromine to polystyrene was 3.33; the total equivalents of bromine was 2.78; the temperature range was 0° C. to 5° C.; the feed times for the bromine/polystyrene was 32 min/38 min; and the cook time was 150 minutes.

Table 2 gives some of the properties of the brominated polystyrenes produced in Examples IV and V.

TABLE 2

HP 7010 RUNS USING PRE-MIXED REACTANTS

| Example | IV | V |
| --- | --- | --- |
| Total Br (wt %) | 68.9 | 69.8 |
| Total Cl (ppm, by XRF) | — | <100 |
| Hydrolyzable Br (ppm) | 1183 | 3038 |
| TGA 1% wt loss temp. (° C.) | 357 | 375 |
| GPC Wt. Ave. Mol. Wt. (light scat.) | — | 620,000 |
| Calc'd. Theo. $M_w$ (light scat.) | 590,000 | 610,000 |
| Solution Color | | |
| L | 96.47 | 96.86 |
| a | −2.45 | −2.30 |
| b | 14.30 | 11.16 |
| ΔE | 14.90 | 11.84 |

Production of Brominated Polystyrenes of this Invention

The brominated polystyrenes of this invention are not conventionally produced. Generally, a suitable process comprises feeding a mixture of bromine and a solution of bromochloromethane and polystyrene (2.5 to 5 moles of bromine per mole of styrene in the polystyrene) to a reactor containing a further amount of bromochloromethane and a catalytic amount of $AlCl_3$. [The mixture of polystyrene, bromochloromethane and bromine is substantially free of a bromination catalyst. The phrase, "substantially free of a bromination catalyst", is to be taken to mean less than a catalytically effective amount of catalyst. With such low amounts of catalyst, little or no catalyzed bromination or cross-linking should occur. Generally, such amounts will be less than 500 ppm based on the weight of polystyrene reactant present.] The reaction temperature will be within the range of from about 0° C. to about 10° C. After the reaction mass is formed, it is cooked 0.5 to 3 hours. After the cook period, the reaction product is worked up by adding sodium sulfite, sodium gluconate and sodium hydroxide to deactivated the catalyst, kill any remaining brominating agent and to adjust the reaction mass pH. After these treatments, the reaction mass is settled to obtain a two-phase reaction mass containing an organic phase, which contains, as a solute, the brominated styrenic polymer product and an aqueous phase. The aqueous phase is decanted and the remaining organic phase is stripped of its solvent component. It is most convenient to accomplish this strip by pouring the organic phase into boiling water. As the solvent is flashed off, the brominated styrenic polymer product forms a precipitate. The precipitate can be recovered by any liquid-solid separation technique, e.g., filtration, centrifugation, etc, The recovered precipitate is then dried. In the production of brominated polystyrene, it is important that the iron content be kept to a minimum, say less than about 10 ppm iron. The introduction of iron into the product usually occurs due to iron equipment which is in contact with the reaction and product streams. Thus, it is preferred to use process equipment which does not act as a source of iron contamination. For example, the equipment can be glass-lined or corrosion resistant alloy.

A more detailed process description with a drawing is given below.

DESCRIPTION OF THE DRAWING

FIG. 1 is a schematic diagram depicting a process suitable for producing brominated polystyrenes of this invention.

DETAILED DESCRIPTION OF PROCESS

The polystyrenes that are useful to produce the brominated polystyrenes of this invention via the instant process are any of those which have been described supra. Also, as mentioned previously, it is preferred that the polystyrene be additive-free. Again, a most preferred polystyrene reactant is Styron® 612 which is marketed by The Dow Chemical Company.

The catalyst used in the processes of this invention can be any of the aluminum based catalysts, e.g., $AlCl_3$, $AlBr_3$ and Al. Mixtures of aluminum catalysts can also be used. Once the catalyst has been added to the reaction system, it may undergo some reaction without significant loss of catalytic activity, e.g., $AlCl_3$ may convert to some extent to $AlBr_3$. $AlCl_3$, because of its availability and price, is the catalyst of choice.

The catalyst is used in an amount which is sufficient to obtain the catalytic effect sought. These catalytic amounts will depend on the activity of the catalyst, but will generally fall within the range of from about 0.2 to about 5 weight percent and preferably within the range of from about 0.5 to about 5 weight percent, based on the weight of the styrenic polymer being brominated. The most active catalysts will be used in the lower amounts, while the less active catalysts will be used in the higher amounts. When $AlCl_3$ is the catalyst, amounts within the range of from about 0.5 to about 3 weight percent are preferred.

The brominating agent is preferably bromine. Bromine can be obtained commercially in the diatomic form or can be generated by the oxidation of HBr. $Br_2$ can be supplied either as a liquid or a gas. The amount of brominating agent used in the process should provide an overall mole ratio of total brominating agent to total styrenic polymer fed which will provide from 1 to 3 bromine substitutions per styrenic monomer unit in the polymer. It is preferred that the brominated polymer of this invention contain above about 68 wt % bromine and most preferably within the range of from about 69 to 71 wt % bromine. For any particular styrenic polymer, the amount of brominating agent used in the process will be determined by the bromine content desired considering the highest bromine content which is obtainable with the process parameters chosen. The higher bromine contents will require the most brominating agent. It is pointed out that as perbromination is approached, it becomes more difficult to substitute the last bromines. Adding ever larger amounts of a brominating agent does not always attenuate this difficulty. However, it is helpful, in attempting to maximize the bromine content, to provide a small stoichiometric excess of brominating agent. Stoichiometric excesses up to about 10% are preferred. The stoichiometry is easily determined as it requires one mole of $Br_2$ per substitution sought. In practice, the practitioner will determine the bromine content sought on a weight basis and then will calculate, on an idealized basis, the number of moles of brominating agent needed to obtain the same. For example, if the styrenic polymer is polystyrene and the bromine content sought is 68 wt %, at least 2.7 moles of bromine per styrenic monomer unit will be required, not including any desired stoichiometric excess.

All of the bromine can be added with the polystyrene-bromochloromethane solution or a portion of the bromine can be pre-added to the reactor with the remainder being added with the solution. If pre-addition is to be used then the pre-added portion will amount to 0.5 to 5% of the total bromine used in the process.

While the foregoing describes the overall quantitative relationship between the brominating agent and styrenic polymer, the quantitative relationship between these two reactants in the feed mixture has not been fully discussed. Generally, the mixture which is to be fed is formed from about 1 to about 8 moles of brominating agent per mole of styrenic monomer units at any time during the feed period. During the feed, the quantitative relationship can be constant or can vary within the above-mentioned range. (It is within the scope of this invention to allow for some excursions outside of the range so long as such does not do significant harm to the process efficiency or to product quality.) A preferred range is from about 2.5 to about 5 moles of brominating agent per mole of styrenic monomer units to form the feed mixture. As can be appreciated, the use of an amount of brominating agent in the feed mixture which gives a mole ratio of brominating agent to styrenic monomer units which is less than or greater than the selected overall mole ratio of brominating agent to styrenic monomer units will result in exhaustion of either the brominating agent or the styrenic polymer as a mixture constituent before exhaustion of the other constituent. For example, if the practitioner chooses to produce brominated polystyrene with a 70 wt % bromine content, an overall molar ratio of bromine to styrenic monomer units of 3.0:1, and any excess if desired, would be suitable. If the practitioner chooses to form a feed mixture in which the molar ratio of bromine to styrenic monomer units is 1:1, it can be seen that the amount of polystyrene to be fed will be completed before obtaining the needed overall amount of bromine. In this case, the practitioner first uses the 1:1 mixture and then continues on with just a bromine feed after the polystyrene feed has been exhausted. If, on the other hand, the molar ratio in the feed mixture is chosen to be 5:1, then the bromine will first become exhausted and the feed will have to be finished with the polystyrene alone. Generally, it is preferred to have the overall molar ratio and the feed mixture ratio at least somewhat similar. In all cases though, the initial feed should preferably contain at least a molar ratio of bromine to styrenic monomer units of 1:1.

It is preferred that the bromine used in the process of this invention be essentially anhydrous, i.e., contain less than 100 ppm (weight basis) water and contain no more than 10 ppm organic impurities, e.g., oil, grease, carbonyl containing hydrocarbons, iron, and the like. Available, commercial grade bromine may have such purity. If, however, such is not available, the organic impurities and water content of the bromine can be conveniently reduced by mixing together a 3 to 1 volume ratio of bromine and concentrated (94–98 percent) sulfuric acid. A two-phase mix is formed which is stirred for 10–16 hours. After stirring and settling, the sulfuric acid phase, along with the impurities and water, is separated from the bromine phase. To further enhance the purity of the bromine, the recovered bromine phase can be subjected to distillation.

The bromochloromethane solvent is preferably essentially anhydrous, containing less than 100 ppm (weight basis) water. It is most preferred that the solvent contain as little water as is practically obtainable, say between 10 to 30 ppm (weight basis).

The instant process benefits from the reaction mass being in an anhydrous condition. Water tends to affect the catalytic activity of the aluminum catalyst, which effect may hinder the quick aromatic bromination of the styrene rings. If, for some reason, the practitioner has large amounts of water in the process and dewatering is not practical, then it may be possible to overcome the situation by simply increasing the amount of catalyst used. For the instant process, it is not a feature to use water to avoid cross-linking as is taught in U.S. Pat. No. 4,200,703, but rather, the subject process attenuates cross-linking by means which include the novel feeding of a non-catalyzed mixture of polystyrene and bromine to a reactor containing a catalyst.

By forming a solution of bromochloromethane and styrenic polymer, the polymer becomes easy to handle and mix with bromine. The solutions of this invention preferably contain from about 5 to about 50 wt % polymer. More highly preferred are those which contain from about 5 to about 30 wt % polymer.

It is preferred to have the bromination catalyst, to which the bromine/styrenic polymer mixture is fed, to be in association with bromochloromethane so that the catalyst can be in a solution, slurry, dispersion or suspension. Such will enhance reaction mass mixing and mass transfer qualities. The mixture of bromochloromethane and catalyst is best described as a suspension. Generally, it is suitable to use from about 95 to about 99.9 wt %, preferably from about 99 to about 99.8 wt %, bromochloromethane, based on the total weight of bromochloromethane and catalyst.

The styrenic polymer/brominating agent mixture feed should occur expeditiously, with consideration being given to the ability of the process equipment to handle the heat load from the exothermic process, the evolving HBr, and other process concerns. In short, the feed can occur over the shortest time period that will be allowed by the equipment without excursion outside of critical process parameters. Generally, it is anticipated that the feed period will be from 0.5 to 3 hours for a commercial-size plant. Shorter feed periods are expected for smaller scale processes.

The process of this invention occurs at a temperature within the range of from about −20° C. to about 60° C. and preferably within the range of from about 0° C. to about 10° C. Most preferred temperatures are from 0° C. to 5° C. The pressure can be atmospheric, subatmospheric or superatmospheric.

To carry out a process of this invention, a bromination catalyst, say $AlCl_3$, is suspended in essentially anhydrous bromochloromethane, to give an easily stirrable suspension. The suspension is prepared in a glass-lined, stirred reactor and brought to a temperature within the range of from about −5° C. to about 5° C. The mix is kept under an inert, dry atmosphere in the reactor. A solution of a styrenic polymer and bromochloromethane is prepared and intimately mixed with a bromine stream to yield a homogenous mixture. The mixture is fed into the stirred bromination catalyst suspension in the reactor. The intimate mixing of the styrenic polymer solution and bromine can be accomplished in a number of ways. For example, the solution and bromine can be fed to a mixing device, e.g., a mixing nozzle, at the lower end of the diptube in the reactor which extends to a point below the suspension level. The mixing device is designed to obtain the intimate mixing of the solution and bromine. Also, the mixing device acts to impart mixing energy, at the point of feed, to the intimate mixture and catalyst suspension. Another technique for obtaining intimate mixing of the styrenic polymer solution and brominating agent, is to use an exterior reactor loop having an in-line mixer, say an impingement mixer. Generally, the use of an exterior reactor loop includes first charging the reactor with a bromination catalyst slurry, suspension, etc., and then withdrawing from the reactor a stream which is then fed to a mixer external of the reactor. A mixture formed from at least bromine and styrenic polymer is also fed to the mixer to yield a second mixture which is formed from the two feeds to the mixer. The second mixture is subsequently fed back to the reactor.

The stream withdrawn from the reactor will initially comprise the catalyst. After the second mixture is fed to the reactor and the process runs, the withdrawn stream will begin to comprise brominated polystyrene along with catalyst. As the process continues, the degree of bromination of the polystyrene will increase.

Exemplifying the use of an exterior reactor loop, reference is made to FIG. 1 wherein there is shown a reactor, generally designated by the numeral 1. Reactor 1 is a stirred reactor and initially contains a suspension comprising catalyst and bromochloromethane. Reactor discharge conduit 4 provides a stream from reactor 1 which is fed to pump 5. Pump 5 pressurizes the stream so that it is fed with force via conduit 7 to impingement mixer 10. Bromine is fed via conduit 20 to pump $P_1$ while, at the same time, a solution of polystyrene and bromochloromethane is fed via conduit 22 to pump $P_2$. Pumps $P_1$ and $P_2$ feed in-line mixer 11 to obtain an intimate mixture of bromine, polystyrene, and solvent. This intimate mixture is fed to impingement mixer 10, wherein it is intimately mixed with the stream from reactor 1. The discharge from impingement mixer 10 is fed via conduit 33 to reactor 1 through feed port 3. The removal of contents from reactor 1 and their feed to impingement mixer 10 continues to occur until at least substantially all of the bromine and polystyrene/bromochloromethane solution have been fed.

As can be appreciated, the contents of reactor 1 change in composition during the bromine and bromochloromethane solution feeds. Initially, the contents of reactor 1 comprise catalyst and solvent. As the process runs, the reactor contents comprise and begin to become more rich in brominated polystyrene, some of which is underbrominated and some of which is of the degree of bromination sought. During a cook period, the final bromination occurs. Removal of the reactor contents can continue to occur during the cook period to aid in mixing.

Irrespective of whether or not a diptube mixer or an exterior impingement mixer is used, the bromination of styrenic polymer will yield HBr as a major by-product. The HBr formed in the process is usually found in the head space above the reactor contents. It is preferred that the HBr be removed and passed to a water scrubber or stored as dry HBr. A dry, inert gas, say nitrogen, can be used as a pad over the reactor contents to minimize the presence of water therein.

The reactor, in all cases, is preferably kept at a low temperature, e.g., from about 0° C. to about 10° C., during the feed of the styrenic polymer and/or brominating feed, as the case may be, and most preferably from about 0° C. to about 5° C. Also, after the feed is accomplished, the reactor is maintained for a cook period of from about 0.5 to about 6 hours and preferably from about 0.5 to about 1 hour. The cook temperature is within the range of from about 0° C. to about 100° C. and preferably within the range of from about 2° C. to about 5° C. The cook period serves to continue the bromination until the sought degree of bromination is obtained. It may be for a long period if the reaction parameters provide for mild bromination conditions during the bromine-polystyrene feed mixture or it may be for a short period if the parameters chosen provide for more severe bromination conditions. The cook period can occur in the reactor.

After the cook period, the reaction mass can be treated with water, sodium sulfite, sodium gluconate and sodium hydroxide to deactivate the catalyst, kill any remaining brominating agent and to adjust the reaction mass pH. After these treatments, the reaction mass is settled to obtain a two-phase reaction mass containing an organic phase, which contains, as a solute, the brominated styrenic polymer product, and an aqueous phase. The aqueous phase is decanted and the remaining organic phase is stripped of its solvent component. It is most convenient to accomplish this strip by pouring the organic phase into boiling or near-boiling water. As the solvent is flashed off, the brominated styrenic polymer product forms a precipitate. To aid in producing an easily recoverable precipitate, it is preferred that a surfactant, such as dioctyl sulfosuccinate sodium salt, be added to the hot water. See Example IV. The amount of dioctyl sulfosuccinate used can be within the range of from about 0.01 to about 0.05 wt %, based upon the total weight of water and surfactant. The precipitate can be recovered by any liquid-solid separation technique, e.g., filtration, centrifugation, etc. The recovered precipitate is then dried.

EXAMPLE VI

A 0.910 g (6.82 mmol) portion of aluminum chloride was suspended (stirred at 250 rpm) in 190 g of dry (13 ppm water) bromochloromethane (BCM) in 1-L jacketed flask cooled to 0° C. by circulating glycol bath. A 419.86 g portion of a 10.00 wt % solution of polystyrene (403.1/mmol) in dry BCM was pumped at a constant rate of 8.46 g/min (8.13 mmol/min) to a jacketed, glycol-cooled mixing tee mounted on the reaction flask. At the same time, bromine was pumped at a constant rate of 6.09 g/min (38.1 mmol/min) to the same mixing tee where it combined with the polystyrene solution (feed mol ratio $Br_2$/PS is 4.69) before dropping into the stirred catalyst suspension in the reaction flask. The bromine feed was stopped after 30.0 min (1143.5 mmol) and the polystyrene solution feed was stopped after 49.6 min (overall mol ratio of $Br_2$/PS is 2.84,). A rinse of 160 g of dry BCM was used for the polystyrene solution feed system to assure complete transfer of the polymer to the reaction flask. The reaction temperature was maintained at 0° C.–5° C. throughout the addition and subsequent 2 hr cook period. The catalyst was deactivated by addition of 16.4 g of 10 wt % aqueous solution of sodium gluconate, and pH was adjusted to 14 by addition of 60.7 g of 10 wt % aqueous NaOH. The reaction mixture was washed with 10 wt % aqueous sodium sulfite followed by a water wash. The product was recovered from the organic phase by addition to vigorously stirred hot (90° C.) water containing 0.02 wt % dioctyl sulfosuccinate sodium salt surfactant. The solvent distilled from the hot water leaving a slurry of the brominated polystyrene product in water. After filtering, the powdery solid was rinsed with water and dried to constant weight in a vacuum oven (150° C./2 torr/5 hr). The dry solid weighed 127.08 g (95% yield). The product contained 69.6 wt % total Br and 3600 ppm hydrolyzable Br. The Hunter-Lab solution color (10 wt % in chlorobenzene) values were L=94.58, a=–-2.79, b=17.29, Delta E=18.34.

EXAMPLE VII

A Y-shaped mixing apparatus having a cooling jacket was equipped with 2 feed lines, each connected to a pump. One of the feed lines was for delivering bromine and the other was for delivering a PS and BCM solution. Bromine (93.3 g, 31.3 ml or 0.583 mole), delivered at a rate of 1 ml/min (19.4 mmol/min), and a PS/BCM solution (22.4 g PS, 0.215 mole and 97 ml or 194 g of anhydrous BCM), delivered at 4 ml/min (7.17 mmol/min), were fed simultaneously from their respective feed lines into the cooled (50 C) Y-mixing apparatus. The resultant intimate mixture from the mixing apparatus was then fed into a cooled (5° C.) suspension of 0.45 g (2 wt % based on PS) of aluminum chloride in 49 ml (98 g) of anhydrous BCM. Evolved HBr was scrubbed by a caustic solution during the reaction. The feeds were complete in 35 minutes and the mixture was cooked for 2 hours at 5° C. After water and sodium sulfite washes, solid BrPS was isolated by precipitating from 500 ml of hot (90° C.) water as described above. A total of 66 g of BrPS (97% yield) was obtained. The product contained 68.4 wt % total Br and 2800 ppm hydrolyzable Br. The HunterLab solution color (10 wt % in chlorobenzene) values were L=96.74, a=−1.90, b=15.99, Delta, E=16.44.

What is claimed:

1. Brominated polystyrene containing from about 68 to about 71 wt % bromine and having an actual $M_w$ which is within 20% of its calculated theoretical $M_w$.

2. The brominated polystyrene of claim 1 wherein the actual $M_w$ is within about 10% of its calculated theoretical $M_w$.

3. The brominated polystyrene of claim 1 wherein it has a ΔE value of less than 20.

4. The brominated polystyrene of claim 1 wherein it has a ΔE value of from about 5 to about 18.

5. The brominated polystyrene of claim 1 wherein it has a ΔE value of from about 5 to about 15.

6. The brominated polystyrene of claim 1 wherein the brominated polystyrene is a derivative of polystyrene having a $M_w$ within the range of from about 100,000 to about 500,000.

7. The brominated polystyrene of claim 1 wherein it has a TGA 1% weight loss at a temperature in excess of 340° C.

8. The brominated polystyrene of claim 1 wherein it has a hydrolyzable bromide content less than about 6,000.

9. The brominated polystyrene of claim 1 wherein the brominated polystyrene is a derivative of polystyrene having an $M_w$ within the range of from about 100,000 to about 500,000, and wherein the brominated polystyrene has a ΔE value of less than 20, a TGA 1% weight loss at a temperature in excess of 340° C. and has a hydrolyzable bromide content less than about 6,000.

10. Brominated polystyrene having an actual $M_w$ which is within 10% of its calculated $M_w$.

11. The brominated polystyrene of claim 10 wherein it has a ΔE value of less than 20.

12. The brominated polystyrene of claim 10 wherein it has a ΔE value of from about 5 to about 18.

13. The brominated polystyrene of claim 10 wherein it has a ΔE value of from about 5 to about 15.

14. The brominated polystyrene of claim 10 wherein the brominated polystyrene is a derivative of polystyrene having an $M_w$ within the range of from about 100,000 to about 500,000.

15. The brominated polystyrene of claim 10 wherein it has a TGA 1% weight loss at a temperature in excess of 340° C.

16. The brominated polystyrene of claim 10 wherein it has a hydrolyzable bromide content less than about 6,000.

17. The brominated polystyrene of claim 10 wherein the brominated polystyrene is a derivative of polystyrene having an $M_w$ within the range of from about 100,000 to about 500,000, and wherein the brominated polystyrene has a ΔE value of less than 20, a TGA 1% weight loss at a temperature in excess of 340° C. and a hydrolyzable bromide content less than about 6000.

18. Brominated polystyrene having an actual $M_w$ which is within 20% of its calculated theoretical $M_w$ and having a TGA 1% weight loss at a temperature in the range of from about 345° C. to 380° C.

19. The brominated polystyrene of claim 18 wherein the actual $M_w$ is within about 10% of its calculated theoretical $M_w$.

20. The brominated polystyrene of claim 18 wherein it has a ΔE value of less than 20.

21. The brominated polystyrene of claim 18 wherein it has a ΔE value of from about 5 to about 18.

22. The brominated polystyrene of claim 18 wherein it has a ΔE value of from about 5 to about 15.

23. The brominated polystyrene of claim 18 wherein the brominated polystyrene is a derivative of polystyrene having an $M_w$ within the range of from about 100,000 to about 500,000.

24. The brominated polystyrene of claim 18 wherein it has a hydrolyzable bromide content less than about 6,000.

25. The brominated polystyrene of claim 18 wherein the brominated polystyrene is a derivative of polystyrene having an $M_w$ within the range of from about 100,000 to about 500,000, and wherein the brominated polystyrene has a ΔE value of less than 20 and a hydrolyzable bromide content less than about 6,000.

26. The brominated polystyrene of claim 25 wherein the compound has a bromine content of from about 68 to 71 wt %.

27. The brominated polystyrene of claim 25 wherein the compound has a bromine content in excess of 68 wt %.

28. The brominated polystyrene of claim 18 wherein the compound has a bromine content of from about 68 to 71 wt %.

29. The brominated polystyrene of claim 18 wherein the compound has a bromine content in excess of 68 wt %.

30. Brominated polystyrene derivative of polystyrene containing at least about 68 wt % bromine and having an actual $M_w$ which is within 20% of its calculated theoretical $M_w$.

31. The brominated polystyrene of claim 30 wherein the actual $M_w$ is within about 10% of its calculated theoretical $M_w$.

32. The brominated polystyrene of claim 30 wherein it has a ΔE value of less than 20.

33. The brominated polystyrene of claim 30 wherein it has a ΔE value of from about 5 to about 18.

34. The brominated polystyrene of claim 30 wherein it has a ΔE value of from about 5 to about 15.

35. The brominated polystyrene of claim 30 wherein the brominated polystyrene is a derivative of polystyrene having an $M_w$ within the range of from about 100,000 to about 500,000.

36. The brominated polystyrene of claim 30 wherein it has a TGA 1% weight loss at a temperature in excess of 340° C.

37. The brominated polystyrene of claim 30 wherein it has a hydrolyzable bromide content less than about 6,000.

38. The brominated polystyrene of claim 30 wherein the brominated polystyrene is a derivative of polystyrene having an $M_w$ within the range of from about 100,000 to about 500,000, and wherein the brominated polystyrene has a ΔE value of less than 20, a TGA 1% weight loss at a temperature in excess of 340° C. and a hydrolyzable bromide content less than about 6,000.

* * * * *

UNITED STATES PATENT AND TRADEMARK OFFICE
CERTIFICATE OF CORRECTION

PATENT NO.    : 6,326,439 B1
DATED         : December 4, 2001
INVENTOR(S)   : Billie B. Dadgar et al.

It is certified that error appears in the above-identified patent and that said Letters Patent is hereby corrected as shown below:

Column 17,
Line 28, reads "...a Mw within..." and should read -- an Mw within... --
Line 39, reads "340 C. and has a ..." and should read -- ...340 C. and a... --

Column 18,
Line 29, reads "...of claim 18 wherein..." and should read -- ...of claim 17 wherein... --
Line 32, reads "...of claim 18..." and should read -- ...of claim 17... --

Signed and Sealed this

Twenty-second Day of March, 2005

JON W. DUDAS
*Director of the United States Patent and Trademark Office*